July 24, 1956
M. D. KOONTZ
2,756,072
STABILIZED TRAILER LOAD DISTRIBUTOR
Filed May 14, 1952
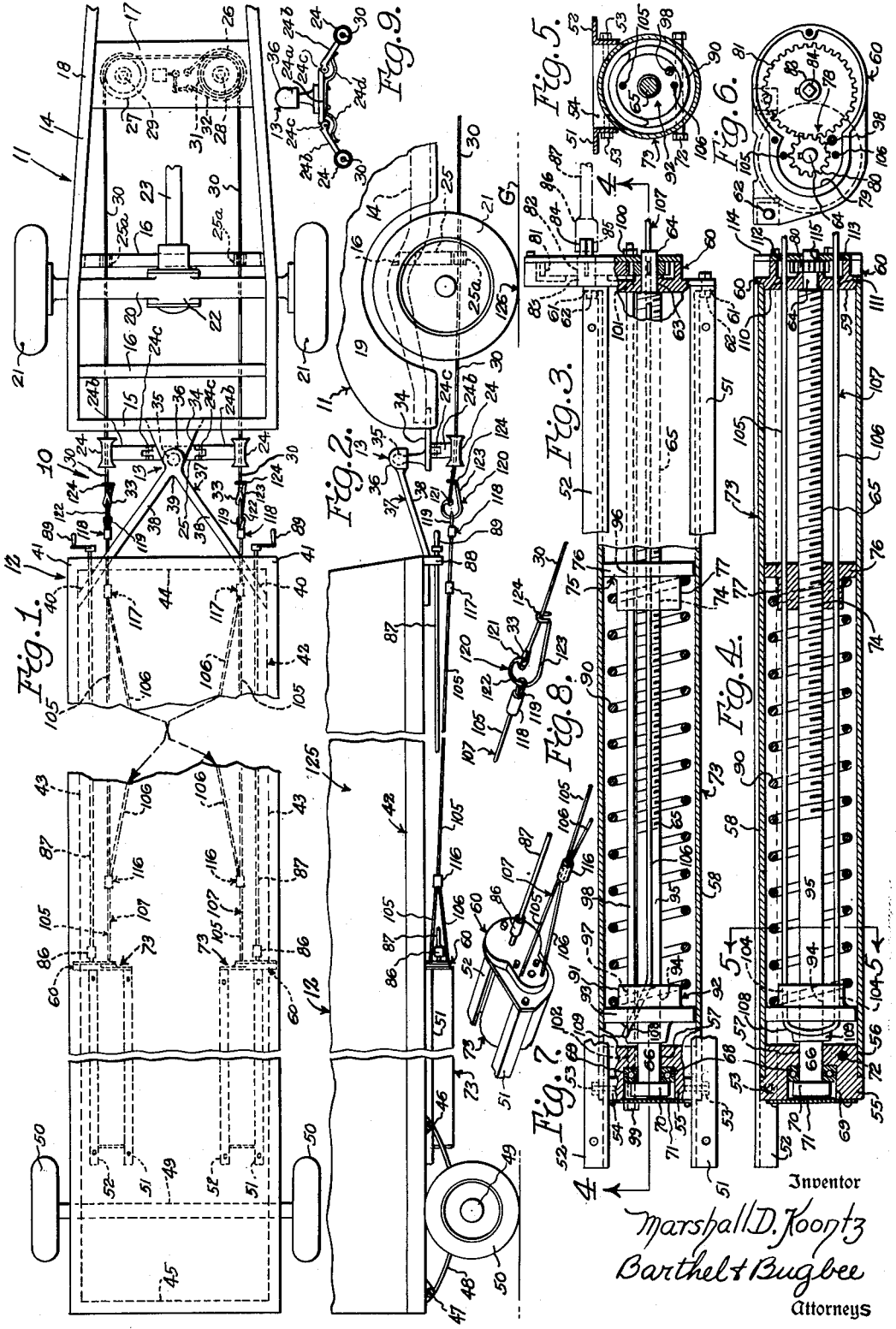
Inventor
Marshall D. Koontz
Barthel & Bugbee
Attorneys United States Patent Office 2,756,072
Patented July 24, 1956

2,756,072

STABILIZED TRAILER LOAD DISTRIBUTOR

Marshall D. Koontz, Detroit, Mich.

Application May 14, 1952, Serial No. 287,686

5 Claims. (Cl. 280—405)

This invention relates to tractor-trailer vehicle combinations and, in particular, to load distributors for such combinations.

One object of this invention is to provide an improved load distributor for tractor-trailer vehicle combinations whereby the load of a semi-trailer may be adjusted to transfer a portion thereof to the tractor and consequently to alter the weight distribution of the load between the front and rear wheels of the tractor, so as to increase the traction of the front wheels, improve steering, prevent jack-knifing or nose-diving of the tractor, and vary the proportionate wheel loads to satisfy State highway laws.

Another object is to provide an improved load distributor for tractor-trailer vehicle combinations of the foregoing character wherein the load is transmitted through elongated flexible members such as cables or chains which extend approximately parallel to the sides of the trailer but which are also cross-connected diagonally so as to stabilize the trailer by eliminating side sway thereof.

Another object is to provide an improved load distributor for tractor-trailer vehicle combinations of the foregoing character wherein an improved load-adjusting device is provided for altering the force exerted by the load-distributing springs of the load distributor.

Another object is to provide an improved load distributor for tractor-trailer vehicle combinations of the foregoing character wherein the load-adjusting device includes an improved means of anchoring and guiding the cable.

Other objects and advantages of the invention will become apparent during the course of the following description of the accompanying drawings, wherein:

Figure 1 is a top plan view of a semi-trailer and the rearward portion of a tractor embodying one form of the improved stabilized load distributor of the present invention, with the tractor body removed so as to disclose the underlying parts more clearly;

Figure 2 is a side elevation of the load distributor shown in Figure 1;

Figure 3 is an enlarged top plan view, partly in horizontal section, of the load adjustment unit on the left-hand side of the semi-trailer shown in Figures 1 and 2;

Figure 4 is a vertical section through the load adjusting unit taken along the line 4—4 in Figure 3;

Figure 5 is a cross-section taken along the line 5—5 in Figure 4;

Figure 6 is a front elevation of the load adjusting unit of Figures 3 and 4 with the gear box cover plate of the forward end cap removed;

Figure 7 is a perspective view of the forward end of the load adjusting unit on the left-hand side of the semi-trailer, as shown in Figures 1 to 6 inclusive;

Figure 8 is a perspective view of the coupling hook employed for detachably joining the tractor and trailer load transmitting cables, and Figure 9 is a rear elevation of the cable guide supporting device attached to the rearward end of the tractor.

The present invention is an improvement upon the invention disclosed and claimed in my co-pending application Serial No. 168,530, filed June 16, 1950, now Patent No. 2,691,533 issued October 12, 1954, for Load Distributing Arrangement for Tractor-Trailer Combinations, and provides the same advantages of decreasing the excessive load of the semi-trailer upon the rear wheels of the tractor and transferring a portion thereof to the front wheels, thereby increasing steering effectiveness, eliminating "jack-knifing" or "nose-diving" of the tractor. In addition, the present invention not only provides an improved load distributing device for adjusting the proportionate amount of the load of the semi-trailer carried by the front and rear wheels of the tractor, but also substantially eliminates side sway of the trailer so that the driver of the tractor is hardly aware of the presence of the trailer. This elimination of side sway is brought about by cross-connecting the main cables by auxiliary diagonal cables or by extensions of the main cables forming such auxiliary cables.

Referring to the drawings in detail, Figures 1 and 2 show a stabilized tractor-trailer load distributor, generally designated 10, according to one form of the invention, as applied to a conventional towing vehicle or tractor 11 and towed vehicle or trailer 12 interconnected by a coupling device or trailer hitch 13. The tractor 11 has a frame 14 with a rear member 15, cross members 16 and a platform 17 extending between side members 18. Mounted on the frame 14 is a body 19 of any suitable type, also a rear axle 20 carrying rear wheels 21 driven through the usual differential 22 by a drive shaft 23 connected to an engine and transmission (not shown).

Depending from the portion of the coupling device 13 mounted on the tractor 11 is a cross bar 24a having vertically-swinging arms 24b (Figure 9) pivoted to its opposite ends by means of so-called rule hinges 24c and normally urged upwardly by a double-ended leaf spring 24d. Mounted on the outer ends of the arms 24b are bell-mouthed tubular cable guides 24. Also mounted upon and depending from one of the cross members 16 are struts 25 carrying tubular cable guides 25a (Figure 2) aligned with the cable guides 24 in the lower positions of the arms 24b.

Mounted upon the underside of the platform 17 is a cable drum 26 and a cable sheave or pulley 27 rotating upon laterally-spaced shafts 28 and 29. The cable drum 26 is encircled by one or more turns of a tractor load-transmitting cable or flexible tension member 30 which also passes around the sheave or pulley 27. Immediately above the cable drum 26 and connected thereto is a brake drum 31 (Figure 1) having a band brake 32 thereon connected to conventional brake-operating mechanism (not shown) controlled from the driver's cab of the tractor 11, as disclosed in my above-mentioned co-pending application Serial No. 168,530, filed June 15, 1950, now Patent No. 2,691,533.

The tractor cable 30, after passing around the cable drum 26 and sheave or pulley 27 passes through the tubular cable guides 24 and terminates in eyes 33 at their opposite ends in the vicinity of the coupling device 13. Secured to and extending rearwardly from the rearward cross member 15 of the tractor frame 14 is a bracket 34 which carries a lower coupling half consisting of an upstanding ball-headed coupling pin or king pin 35 over which passes the corresponding upper coupling half or socket member 36 attached to the trailer bracket 37. The latter is approximately V-shaped and consists of a pair of arms 38 which converge to a junction 39 at the coupling cap or upper coupling half 36.

The arms 38 of the coupling device 13 are secured at their rearward ends 40 to the forward corners 41 of the trailer frame 42 which, as shown diagrammatically in Figure 1, has elongated substantially parallel side members 43 interconnected at their opposite ends by forward and rearward cross members 44 and 45 respectively. Other cross members ordinarily present in semi-trailers have been omitted from the drawings in order to avoid the additional complexity of numerous dotted lines which their showing would otherwise necessitate.

Secured to the underside of the trailer frame 42 are the usual spring brackets 46 and 47 located near the side members 43 and supporting the trailer suspension springs 48. The showing of the springs 48 is diagrammatical, the usual spring shackles, for example, being omitted. Mounted on the springs 48 in the usual way is the trailer axle 49 which carries the trailer wheels 50 of a conventional design.

Bolted or otherwise secured to the underside of the trailer frame 42 near the side members 43 and in a location forward of the axle 49 are outer and inner angle members 51 and 52 respectively. The views shown in Figures 3 to 7 inclusive are of the load-adjustment unit on the left-hand side of the semi-trailer 12, the one on the right-hand side being oppositely arranged. The side flanges of the angle members 51 and 52 are bolted as at 53 to the upwardly-projecting portion 54 (Figure 5) of a rearward end cap or head 55. The head 55 is provided with a cylindrical portion 56 coaxial with a central bore 57 (Figures 3 and 4) and serving to receive the rearward end of a tubular casing or housing 58. The forward end of the housing 58 is secured to a correspondingly-shaped cylindrical portion 59 upon a forward end cap or head 60. The forward ends 61 of the side flanges of the angle members 52 are bent at right angles thereto and bolted or otherwise secured at 62 to the forward head 60. The latter is likewise provided with a central bore 63 coaxial with the bore 57 and serving to rotatably receive the reduced diameter forward end portion 64 of a screw shaft 65, the rearward end portion 66 of which is received within the bore 57 and journaled in the anti-friction thrust bearing 68 seated in a counterbore 69 coaxial with the bore 57. An enlargement 70 on the rearward end of the screw shaft 66 engages the thrust bearing 68 and is concealed from view and protected against dust by the cover plate 71 bolted or otherwise secured to the rearward end of the end cap or head 55 (Figure 4). The casing 58 and head 56 are held in assembly by a bolt 72 passing transversely therethrough (Figures 4 and 5). The load-adjusting unit containing these parts and shown in Figures 3 to 7 inclusive is generally designated by the reference numeral 73.

Threaded as at 74 upon the screw shaft 65 is an adjustable circular spring abutment or spring adjustment nut 75 having an annular enlargement 76 serving as a spring abutment and a cylindrical boss 77 serving as a spring support and guide. The screw shaft 65 is manually rotated in order to move the spring abutment 75 to and fro along the shaft 65 by means of a gear set 78 mounted in a recess 79 in the forward head 60 and containing a pinion 80 keyed or otherwise drivingly secured to the forward end of the reduced diameter portion 64 of the screw shaft 65. Meshing with the pinion 80 (Figure 6) is a gear 81 which is keyed or otherwise drivingly secured to a stub shaft 82 which is journaled in the bore 83 in the head 60 (Figure 3) and has a squared head 84 engaged by the correspondingly squared socket 85 in the enlarged end 86 of a crankshaft 87. The latter extends forwardly to the forward end of the trailer frame 42 and is journaled in and passes through a bracket 88 secured to and extending downwardly from the forward end of the frame 42. Drivingly connected to and mounted on the forward end of the crankshaft 87 is a hand crank 89 (Figure 1) by which the crankshaft 87 and consequently the gear 81, pinion 80 and screw shaft 65 are rotated in order to move the spring abutment 75 to and fro along the screw shaft 65 in the manner of a nut.

Mounted on the boss 77 of the spring abutment 75 is the forward end of a helical compression spring 90 coaxial with and encircling the screw shaft 65. The rearward end of the spring 90 is mounted on a similar cylindrical boss 91 of a rearward spring abutment 92 having an annular enlargement 93 (Figure 3) engaging the rearward end of the spring. The spring abutment 92 is provided with a smooth bore 94 which loosely and slidably fits the unthreaded rearward portion 95 of the screw shaft 65 so as to be reciprocable therealong. The forward and rearward spring abutments 75 and 92 are provided with smooth bores 96 and 97 respectively for loosely and slidably engaging a guide rod 98 in the form of an elongated bolt, the rearward end of which is provided with a head 99 and the forward end with an anchor nut 100. The heads 60 and 55 are bored longitudinally as at 101 and 102 respectively for the passage of the guide rod 98. The guide rod 98 prevents rotation of the spring abutments 75 and 92 relatively to the screw shaft 65 and in this manner acts as a key or spline.

Each of the spring abutments 75 and 92 is provided with a pair of axially-decentered longitudinal bores 103 and 104 respectively for the passage of the upper and lower courses 105 and 106 respectively of a load-transmitting cable 107. The rearmost portion of the cable 107 consists of a loop 108 passing over the rearwardly-projecting hub 109 of the spring abutment 92 (Figures 3 and 4). The bores 103 and 104 are sufficiently larger than the diameter of the cable 107 to permit relative sliding motion between them. The inner and outer courses 105 and 106 pass respectively through bores 110 and 111 (Figure 4) in the head 60 and also through bores 112 and 113 in the cover plate 114 thereof which is bolted to the head 60 and closes the recess 79. The cover plate 114 is also bored as at 115 for the passage of the reduced diameter portion 64 of the screw shaft 65.

The upper and lower courses 105 and 106 of the cable 107 (Figure 7) are secured to one another by the cable clamp 116 at a location forward of the load-adjusting unit 73. The upper course 105 proceeds forwardly through the rearward cable clamp 116 to and through an intermediate cable clamp 117 to and through a forward cable clamp 118 (Figure 1) forming a loop or eye 119 immediately beyond the latter and then being doubled back upon itself and secured by the forward cable clamp 118.

The lower course 106 on the other hand proceeds through the rearward cable clamp 116 and then abruptly changes its direction to move diagonally forward to a junction, at the intermediate cable clamp 117 on the opposite side of the vehicle, with the upper course 105 on the said opposite side of the vehicle. The upper or main course 105 of each cable 107 is coupled to the tractor load-transmitting cable 30 by a special cable-coupling hook 120 (Figures 1, 2 and 8). The cable-coupling hook 120 has an eye 121 linked with the eye 33 on the rearward end of the tractor load-transmitting cable 30 and an arcuate portion 122 which is threaded through the loop 119 on the forward end of the upper or main course 105 of the trailer load-transmitting cable 107 and continues forwardly in a straight portion 123, terminating in a transversely-disposed U-shaped catch 124 which hooks over the tractor load-transmitting cable 30. The coupling hooks 120 serve to transmit the load from the cargo contained in the trailer body, generally designated 125, to the tractor or towing vehicle 11 by way of the load adjusting units 73 and cables 107.

In the operation of the invention, let it be assumed that the tractor and trailer are connected to one another in the manner shown in Figures 1 and 2, with the cable-coupling hooks 120 in their coupling positions. Let it also be assumed that a load such as a cargo of goods, has been placed in the body 125 of the semi-trailer 12, and that the latter has been coupled to the tractor or towing vehicle 11 by means of the coupling device or trailer hitch 13 and by the coupling hooks 120. Without the load distributor 10 in operation, the load in the semi-trailer body 125 as well as that of the semi-trailer itself is borne in part by the wheels 50 and in part by the coupling device 13. The part of the load borne by the coupling device 13 is transmitted through the bracket 34 to the rearward end of the tractor frame 14 and thence largely to the rearward wheels 21 of the tractor 11. This action is unsatisfactory since it causes the points of contact 126 of the wheels 21 with the ground G to act as fulcrums (Figure 2). As the load presses down upon the bracket 34 at the rearward end of the tractor 11, it naturally tends to swing the forward end of the latter upward around the fulcrums 126, tending to raise the front wheels out of contact with the ground G or at least to lighten their grip upon the ground G. Accordingly, without the operation of the device 10, the steering of the tractor 11 is impaired and the vehicle is subject to "jack-knifing" or "nose-diving" and the trailer 12 is subject to side sway and whipping back and forth relatively to the tractor 11.

To remedy this unsatisfactory situation by means of the load distributor 10 of the present invention, the operator rotates the shafts 87 by means of the hand cranks 89, consequently rotating the screw shafts 65 in such a direction as to cause the spring adjustment nuts 75 to move rearwardly so as to compress the springs 90. The compression of the springs 90 applies tension to the flexible tension members or cables 107 and 30. This tension in turn applies a vertical component of force to the tractor frame 14 by way of the tubular cable guides 25a and struts 25, counteracting the downward thrust of the load upon the kingpin 35 and bracket 34 of the coupling device or trailer hitch 13 (Figure 2). It will be evident that the greater the tension applied in this manner to the flexible tension members 107 and 30, the greater is the load counteracting force applied to the struts 25 and therefore the greater is the proportion of the load subtracted from the rear wheels 21 of the tractor 11 and transferred to the front wheels thereof.

This tension is applied to the cables of flexible tension members 107 by means of the sliding spring abutments 92 at the rearward side of the load adjustment units 73 (Figures 3 and 4). The compression springs 90 also provide a cushioning action which tends to absorb road shocks and also to equalize the tension on opposite ends of the flexible load-transmitting member or tractor cable 30, as transmitted thereto by the upper courses 105 of the flexible load-transmitting members or trailer cables 107.

Furthermore, the diagonally-disposed cross connecting cable courses or auxiliary cable courses 106 interconnect the main courses 105 on opposite sides of the trailer at the intermediate cable clamp 117 and consequently exert a deterring action upon side sway or whipping to and fro of the semi-trailer as it proceeds along the highway. Due to the improved traction obtained by the front wheels of the tractor or towing vehicle 11 upon the ground or road G, the operator or driver finds not only that he is able to obtain greatly improved steering, but also that he is able to stop the tractor-trailer combination 11—12 in a much shorter space due to the enhanced efficiency of his front wheel brakes resulting from the improved traction of the front wheels of his tractor 11 upon the ground G. At the same time, the driver or operator is enabled to comply more easily with the various State laws prescribing the maximum permissible load upon each wheel by redistributing the load as desired upon the wheels of the tractor and trailer by the use of the invention.

In the accompanying drawings, the invention has been shown purely for purposes of exemplification as applied to a commercial semi-trailer and tractor combination. It will be obvious, however, that the invention is equally applicable to a private house trailer and pleasure automobile combination.

What I claim is:

1. A stabilized load distributor for a trailer comprising resiliently-urged self-adjusting trailer tension member tightening means secured to a rearward portion of said trailer, a pair of laterally-spaced main flexible tension members connected to said tightening means and extending forwardly therefrom in directions substantially parallel to the center line of said trailer, and an auxiliary flexible tension member extending from a rearward portion of one of said main tension members to a forward portion of the other main tension member.

2. A stabilized load distributor for a trailer comprising resiliently-urged self-adjusting trailer tension member tightening means secured to a rearward portion of said trailer, a pair of laterally-spaced main flexible tension members connected to said tightening means and extending forwardly therefrom in directions substantially parallel to the center line of said trailer, and an auxiliary flexible tension member extending from a rearward portion of one of said main tension members to a forward portion of the other main tension member, said auxiliary tension member extending diagonally across said trailer.

3. A stabilized load distributor for a trailer comprising resiliently-urged self-adjusting trailer tension member tightening means secured to a rearward portion of said trailer, a pair of laterally-spaced main flexible tension members connected to said tightening means and extending forwardly therefrom in direction substantially parallel to the center line of said trailer, and an auxiliary flexible tension member extending from a rearward portion of each of said main tension members to a forward portion of the other main tension member.

4. A stabilized load distributor for a trailer comprising resiliently-urged self-adjusting trailer tension member tightening means secured to a rearward portion of said trailer, a pair of laterally-spaced main flexible tension members connected to said tightening means and extending forwardly therefrom in direction substantially parallel to the center line of said trailer, and an auxiliary flexible tension member extending from a rearward portion of each of said main tension members to a forward portion of the other main tension member, said auxiliary tension members extending diagonally across said trailer from opposite sides thereof.

5. A stabilized load distributor for a trailer comprising resiliently-urged self-adjusting trailer tension member tightening means secured to a rearward portion of said trailer, a pair of laterally-spaced main flexible tension members connected to said tightening means and extending forwardly therefrom in directions substantially parallel to the center line of said trailer, and an auxiliary flexible tension member extending from a rearward portion of each of said main tension members to a forward portion of the other main tension member, said auxiliary tension members extending diagonally across said trailer from opposite sides thereof and crossing one another at a location intermediate said rearward and forward portions.

References Cited in the file of this patent

UNITED STATES PATENTS

| Number | Name | Date |
|---|---|---|
| 85,388 | Jones | Dec. 29, 1868 |
| 453,573 | Beery | June 2, 1891 |
| 518,502 | Hammond | Apr. 17, 1894 |
| 576,543 | Burr | Feb. 9, 1897 |
| 919,056 | Mitchell | Apr. 20, 1909 |
| 1,336,735 | Doe | Apr. 13, 1920 |
| 1,391,101 | Doe | Sept. 20, 1921 |
| 1,604,741 | Dyer | Oct. 26, 1926 |
| 1,870,740 | Leiter | Aug. 9, 1932 |
| 2,159,721 | Wright | May 23, 1934 |
| 2,259,923 | Byrne et al. | Oct. 21, 1941 |
| 2,493,874 | Hume | Jan. 10, 1950 |
| 2,554,801 | Vogel | May 29, 1951 |

FOREIGN PATENTS

| Number | Country | Date |
|---|---|---|
| 498,399 | Germany | May 22, 1930 |